US007525202B2

(12) United States Patent
Freedman et al.

(10) Patent No.: US 7,525,202 B2
(45) Date of Patent: Apr. 28, 2009

(54) QUANTUM COMPUTATIONAL SYSTEMS

(75) Inventors: Michael Freedman, Redmond, WA (US); Chetan Nayak, Santa Monica, CA (US); Kirill Shtengel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/931,083

(22) Filed: Aug. 31, 2004

(65) Prior Publication Data

US 2006/0045269 A1 Mar. 2, 2006

(51) Int. Cl.
*H01L 23/58* (2006.01)
(52) U.S. Cl. .................. 257/798; 257/31; 257/32; 257/33; 257/34; 257/35; 257/E27.001; 706/29; 706/33; 380/28; 380/29; 380/30; 380/287
(58) Field of Classification Search ............ 380/28–30, 380/287; 257/31–35, 798; 706/29, 33
See application file for complete search history.

(56) References Cited

OTHER PUBLICATIONS

P. Bonderson, "Non-Abelian Anyons Interferometry," P.hD. Dissertation, Caltech, May 23, 2007.*
Bonderson et al. "Detecting Non-Abelian Statistics in the V=5/2 Fractional Quantum Hall State," PRL 96, 16803-1, 2006.*
Balents, L. et al., "Fractionalization in an Easy-Axis Kagome Antiferromagent", *arXiv:cond-mat*/0110005 v1, Sep. 29, 2001, 1-8.
Doucot, B. et al., "Topological Order in the Insulating Josephson Junction Array", *arXiv:cond-mat*/0211146 v1, Nov. 7, 2002, 1-4.
Freedman, M.H. et al., "Topological Quantum Computation", *arXiv:quant-ph*/0101025 v2, Sep. 24, 2002, 1-12.
Freedman, M. H., "P/NP, and the Quantum Field Computer", *Proc. Natl. Acad. Sci. USA*, Jan. 1998, 95, 98-101.
Freedman, M.H. et al., "The Two_Eigenvalue Problem and Density of Jones Representation of Braid Groups", *Commun. Math. Phys.*, 2002, 228, 177-199.
Freedman, M. et al., "A Class of P, T-Invariant Topological Phases of Interacting Electrons", *Annals of Physics*, 2004, 310, 428-492.
Freedman, M.H., A Magnetic Model with a Possible Chern-Simons Phase(with an Appendix by F.Goodman and H. Wenzl), *Commun. Math Phys.*, 2003, 234, 129-183.
Freedman, M.H. et al., "A Modular Functor Which is Universal for Quantum Computation", *Commun. Math. Phys.*, 2002, 227, 605-622.
Freedman, M.H. et al., "Simulation of Topological Field Theories by Quantum Computers", *Commun. Math. Phys.*, 2002, 227, 587-603.
Freedman, M.H. et al., "Topological Quantum Computation", *Bulletin (New Series) of the American Mathematical Society*, Oct. 10, 2002, 40(1), 31-38.
Freedman, M.H. et al., "Topological Quantum Computation", *arXiv:quant-ph*/0101025 v2, Oct. 31, 2002, 1-12.
Kitaev, A.U., "Fault-Tolerant Quantum Computation by Anyons", *L.D. Landau Institute for Theoretical Physics, arXiv:quant-ph*/9707021 v1, Oct. 7, 2002, 1-27.

(Continued)

*Primary Examiner*—Davienne Monbleau
*Assistant Examiner*—Matthew Reames
(74) *Attorney, Agent, or Firm*—Woodcock Washburn LLP

(57) ABSTRACT

Apparatus and methods for performing quantum computations are disclosed. Such quantum computational systems may include quantum computers, quantum cryptography systems, quantum information processing systems, quantum storage media, and special purpose quantum simulators.

24 Claims, 7 Drawing Sheets

OTHER PUBLICATIONS

Lloyd, S. et al., "Robust Quantum Computation by Simulation", *arXiv:quant-ph*/9912040 v1, Dec. 8, 1999, 1-8.
Lloyd, S., "Quantum Computation with Abelian Anyons", *arXiv:quant-ph*/0004010 v2, Apr. 9, 2000, 1-7.
Mochon, C., "Anyon Computers with Smaller Groups", *arXiv:quant-ph*/0306063 v2, Mar. 29, 2004, 1-28.
Ogburn, R. W., "Topological Quantum Computation", *QCQC*, 1998, LNCS1509, 341-356, 1999.
Parsons, P., "Dancing the Quantum Dream", *New Scientist*, Jan. 2004, 30-34.
Wen, X.G., "Non-Abelin Statistics in the Fractional Quantum Hall States", *Phys. Rev. Lett.*, 1991, 66, 802, pp. 1-7.

* cited by examiner

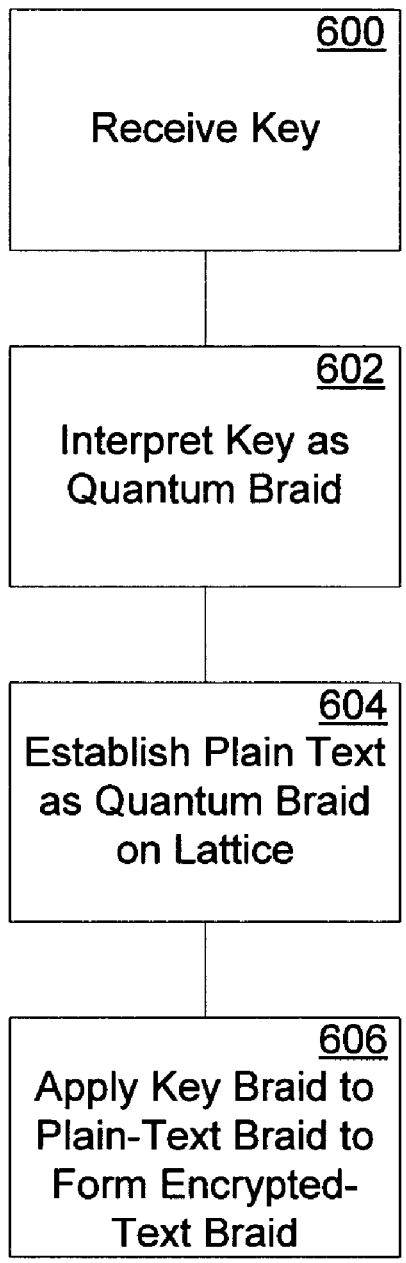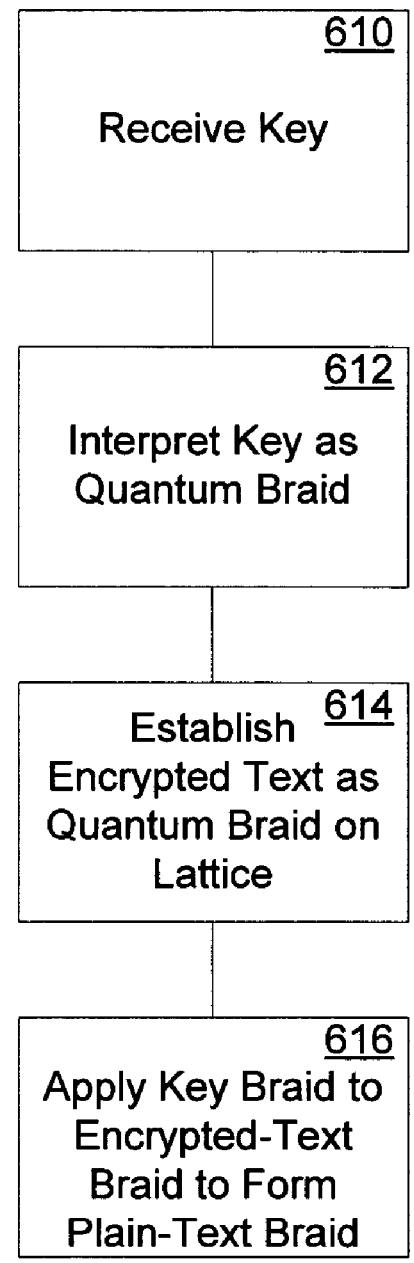
FIG. 6A
FIG. 6B

QUANTUM COMPUTATIONAL SYSTEMS

CROSS-REFERENCE TO RELATED APPLICATIONS

The subject matter disclosed and claimed herein is related to the subject matter disclosed and claimed in U.S. patent applications Ser. Nos. 10/909,005, filed Jul. 30, 2004, Ser. No. 10/930,640, filed on even date herewith, and Ser. No. 10/931,082, filed on even date herewith. The disclosure of each of the above-referenced U.S. patent applications is incorporated herein in its entirety.

FIELD OF THE INVENTION

This invention relates in general to the field of quantum computing. More particularly, this invention relates to topological quantum computing.

BACKGROUND OF THE INVENTION

Since the discovery of the fractional quantum Hall effect in 1982, topological phases of electrons have been a subject of great interest. Many abelian topological phases have been discovered in the context of the quantum Hall regime. More recently, high-temperature superconductivity and other complex materials have provided the impetus for further theoretical studies of and experimental searches for abelian topological phases. The types of microscopic models admitting such phases are now better understood. Much less is known about non-abelian topological phases. They are reputed to be obscure and complicated, and there has been little experimental motivation to consider non-abelian topological phases. However, non-abelian topological states would be an attractive milieu for quantum computation.

It has become increasingly clear that if a new generation of computers could be built to exploit quantum mechanical superpositions, enormous technological implications would follow. In particular, solid state physics, chemistry, and medicine would have a powerful new tool, and cryptography also would be revolutionized.

The standard approach to quantum computation is predicated on the quantum bit ("qubit") model in which one anticipates computing on a local degree of freedom such as a nuclear spin. In a qubit computer, each bit of information is typically encoded in the state of a single particle, such as an electron or photon. This makes the information vulnerable. If a disturbance in the environment changes the state of the particle, the information is lost forever. This is known as decoherence—the loss of the quantum character of the state (i.e., the tendency of the system to become classical). All schemes for controlling decoherence must reach a very demanding and possibly unrealizable accuracy threshold to function.

Topology has been suggested to stabilize quantum information. A topological quantum computer would encode information not in the conventional zeros and ones, but in the configurations of different braids, which are similar to knots but consist of several different threads intertwined around each other. The computer would physically weave braids in space-time, and then nature would take over, carrying out complex calculations very quickly. By encoding information in braids instead of single particles, a topological quantum computer does not require the strenuous isolation of the qubit model and represents a new approach to the problem of decoherence.

In 1997, there were independent proposals by Kitaev and Freedman that quantum computing might be accomplished if the "physical Hilbert space" V of a sufficiently rich TQFT (topological quantum field theory) could be manufactured and manipulated. Hilbert space describes the degrees of freedom in a system. The mathematical construct V would need to be realized as a new and remarkable state for matter and then manipulated at will.

In 2000, Freedman showed that some extraordinarily complicated local Hamiltonian H can be written down whose ground state is V. But this H is an existence theorem only, and is far too complicated to be the starting point for a physical realization.

In 2002, Freedman showed a Hamiltonian involving four-body interactions and stated that after a suitable perturbation, the ground state manifold of H will be the desired state V. This H is less complex than the previously developed H, but it is still only a mathematical construct. One does not see particles, ions, electrons, or any of the prosaic ingredients of the physical world in this prior art model. A Hamiltonian is an energy operator that describes all the possible physical states (eigenstates) of the system and their energy values (eigenvalues).

Freedman further defined the notion of d-isotopy, and showed that if it can be implemented as a ground state of a reasonable Hamiltonian, then this would lead to V and to topological quantum computation. Isotopy is defined as deformation, and two structures that are isotopic are considered to be the same. As shown in the toruses 1 and 2 of FIG. 1A and 1B, respectively, for example, X and X' are isotopic, because one may be gradually deformed into the other. In d-isotopy, small circles can be absorbed as a factor=d. Such closed curves are referred to as multicurves or multiloops. Loop X" in FIG. 1C (winding around torus 3) is not d-isotopic to X or X'. Loops that are unimportant (because, e.g., they comprise a contractible circle) are called trivial loops and it is desirable to remove, as well as count them. Whenever a trivial loop is removed, the picture is multiplied by "d". In other words, if two multiloops are identical except for the presence of a contractible circle, then their function values differ by a factor of d, a fixed positive real number. It has been shown that $d=2 \cos \pi/(k+2)$, where k is a level such as 1, 2, 3, etc. which is a natural parameter of Cherns-Simons theory.

According to Freedman, the parameter d can take on only the "special" values: 1, root2, golden ratio, root3 ... 2 cos $\pi/(k+2)$ (where k is a natural number). At d=1, the space V becomes something already known, if not observed in solid state physics. For d>1, V is new to the subject. Freedman, et al., later showed that d-isotopy is explicable by field theory and that multiloops as domain walls can be alternately interpreted as Wilson loop operators. Thus, d-isotopy is a mathematical structure that can be imposed on the multiloops, and is based on Cherns-Simons theory.

An exotic form of matter is a fractional quantum Hall fluid. It arises when electrons at the flat interface of two semiconductors are subjected to a powerful magnetic field and cooled to temperatures close to absolute zero. The electrons on the flat surface form a disorganized liquid sea of electrons, and if some extra electrons are added, quasi-particles called anyons emerge. Unlike electrons or protons, anyons can have a charge that is a fraction of a whole number.

The fractional quantum Hall fluids at one-third filling (of the first Landau level) are already a rudimentary (abelian) example of the V of a TQFT. To effect quantum computation, it would be desirable to construct states more stable and more easily manipulated than FQHE (fractional quantum Hall effect) fluids.

One property of anyons is that when they are moved around each other, they remember in a physical sense the knottedness of the paths they followed, regardless of the path's complexity. It is desirable to use anyons in a system with complex enough transformations, called non-abelian transformations, to carry out calculations in a topological quantum computation system.

In view of the foregoing, there is a need for systems and methods that overcome the limitations and drawbacks of the prior art.

SUMMARY OF THE INVENTION

Quantum computational systems according to the invention may include quantum computers, quantum cryptography systems, quantum information processing systems, quantum storage media, and special purpose quantum simulators.

In a quantum cryptography system according to the invention, respective braids that correspond to the plain text and the encryption key may be defined. The key braid may be applied to the plain-text braid to generate an encrypted-text braid. To decrypt the encrypted text, the key braid may be applied to the encrypted text braid to reestablish the plain-text braid.

A quantum simulator according to the invention may be a quantum computational device that is programmed to produce information about a particular system or a specific application.

A quantum storage medium according to the invention may include any platform on which information may be stored in the form of a quantum braid.

A quantum information processing system according to the invention may include information stored as a braid. A second braid may be applied to the stored braid to alter the stored braid in such a way that subsequent measurements on the storage medium produce a particular aspect/result.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 6A-6C provide flow diagrams of exemplary methods involving quantum computational systems according to the invention.

DETAILED DESCRIPTION OF ILLUSTRATIVE EMBODIMENTS

General Description of Quantum Computing

Figure 1A:
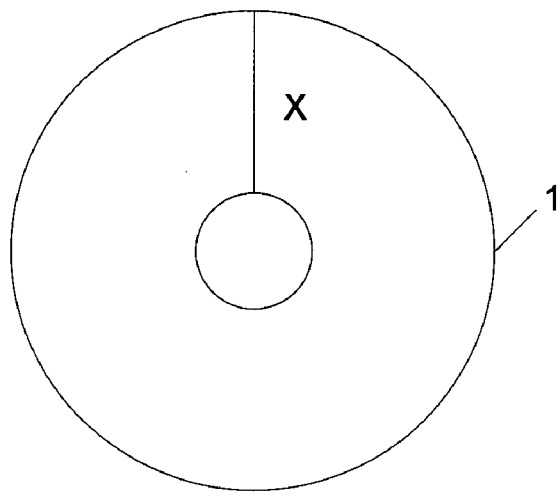
FIGS. 1A, 1B, and 1C are diagrams useful in describing isotopy.
Figure 1B:
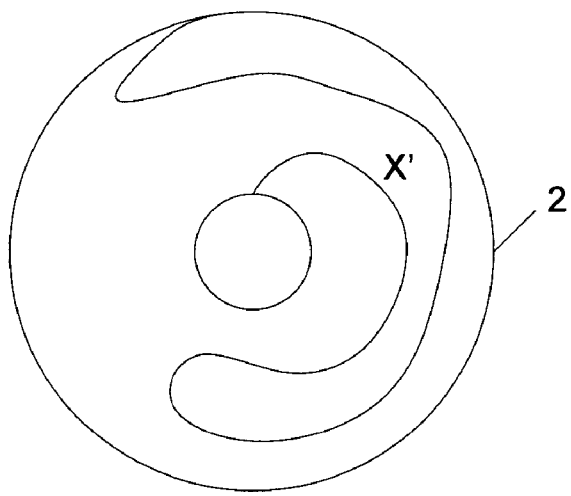
Figure 1C:
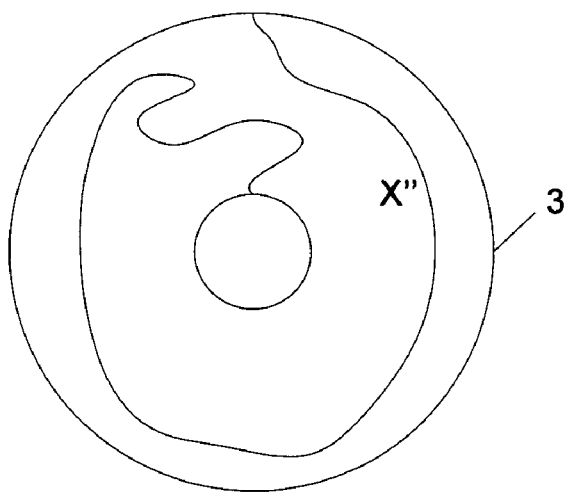

Apparatus and methods according to the invention include identifying a first quantum state of a lattice having a quasi-particle disposed thereon, moving the quasi-particle within the lattice according to at least one predefined rule, identifying a second quantum state of the lattice after the quasi-particle has been moved, and determining a computational result based on the second quantum state of the lattice.

In accordance with the present invention, "realistic" microscopics can be provided for d-isotopy, wherein "realistic" refers to atoms and electrons, for example, as opposed to loops and curves. More particularly, realistic means physical degrees of freedom, with local interaction (the particles are nearby to each other and know of each other's presence). The interactions are potential energy costs of bringing atoms near each other. Existing physical relationships, such as van der waals forces, may be used, along with other physical characteristics, such as tunneling amplitudes. It is desirable to obtain a physical embodiment of the mathematical construct of d-isotopy. In other words, it is desirable to turn the abstract description of the d-isotopy into known physical processes (e.g., tunneling, repulsion, Coulomb interaction).

To go from abstract d-isotopy to real physics, multiloops (i.e., multicurves) are implemented. These multiloops are desirably implemented as broken curves (i.e., "dimer covers", which is a standard term of art in physics). The following rules are desirably implemented as well: (1) isotopy rule—the amplitude of a picture (or a portion of picture) does not change as it is bent; and (2) d rule—to account for the value associated with a small loop. The rules are turned into "fluctuations", which are terms in the Hamiltonian that relate to different states (e.g., flickering between two states).

An exemplary embodiment is directed to an extended Hubbard model with a two-dimensional Kagome lattice and a ring-exchange term, described further below. A dimer cover (such as a one-sixth filled Kagome lattice) along with a topology (such as loops) and rules (such as the d-isotopy rule) are desirably comprised within an exemplary extended Hubbard model. Exemplary particles used in conjunction with an exemplary extended model can be bosons or spinless fermions.

At a filling fraction of one-sixth, the model is analyzed in the lowest non-vanishing order of perturbation theory. For a lattice populated with a certain percentage of particles (e.g., electrons), the particles will naturally dissipate to form the "perfect" arrangement. Thus, if one-sixth of the edges of the triangular lattice are filled with particles (e.g., electrons), a perfect matching of the electrons results (e.g., as the result of the Coulomb repulsion).

An exactly soluble point is determined whose ground state manifold is the extensively degenerate "d-isotopy space", a precondition for a certain type of non-abelian topological order. Near the values $d = 2 \cos \pi/(k+2)$, this space collapses to a stable topological phase with anyonic excitations closely related to SU(2) Chern-Simons theory at level k.

A class of Hamiltonians produces a ground state manifold V=d-isotopy (in some cases "weak d-isotopy") from standard physical processes. The Hamiltonian is an "extended Hubbard model" in certain cases with an additional "ring exchange term". A parameter domain is described along with a lattice on which an exemplary model operates. An exemplary lattice is the Kagome lattice. An exemplary model as described herein can serve as a blueprint for the construction of phases of matter Vd, which is useful for quantum information processing. The present invention opens the topological path to a quantum computer.

The extended Hubbard model formalizes the Hamiltonian (kinetic+potential energy) as a tunneling term plus energy costs which are dependent on individual particle location ("on sight potential") and pair-wise locations (e.g., Coulomb repulsion). For this exemplary model, a ring exchange term may be added, which models collective rotations of large groups of particles (e.g., groups of four particles). According to exemplary embodiments, the cases in which the particles are fermions or bosons are treated separately. The particles can be electrons, Cooper pairs, neutral atoms, phonons, or more exotic "electron fractions" such as chargeons, for example. It is noted that spin is not taken into account in the exemplary embodiments, and so if the particle is specialized to be an electron, either spin must be frozen with a magnetic field or a hyperfine splitting of levels tolerated. It is further noted that a formal transformation may be performed such that these occupation based models may be regarded as purely spin models.

Figure 2:
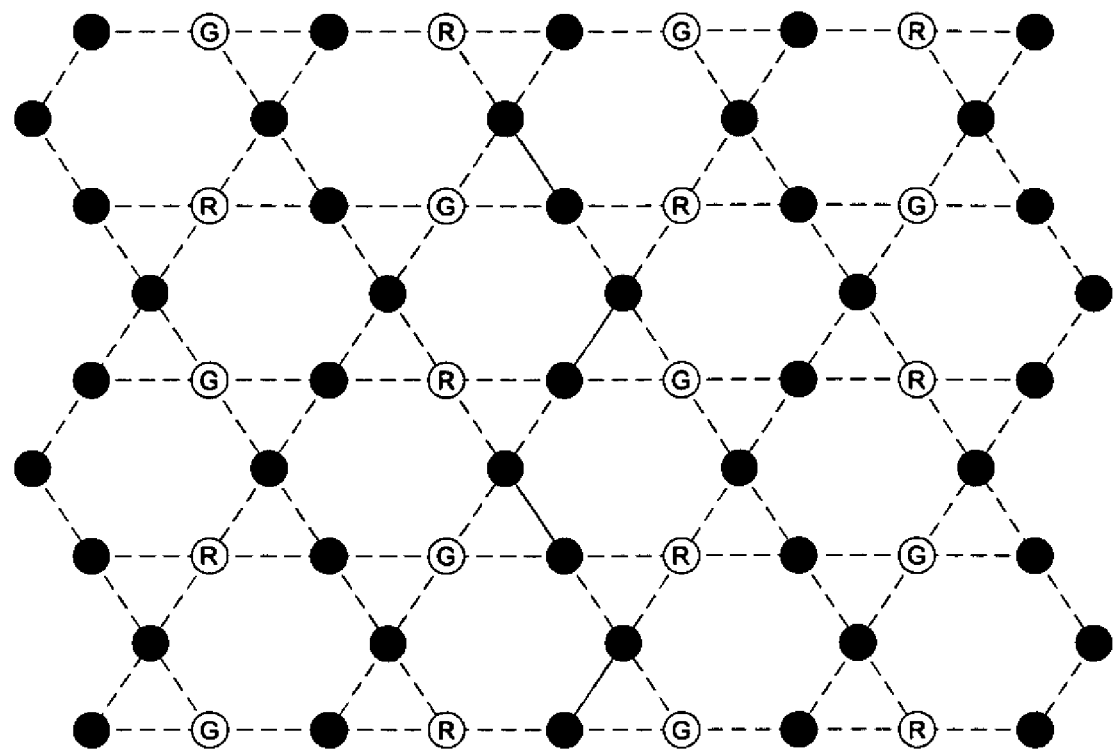
FIG. 2 is a diagram of an exemplary Kagome lattice in accordance with the present invention.

The Kagome lattice is well known in condensed matter physics to support highly "frustrated" spin models with rather mysterious ground states. A Kagome lattice is formed using the centers of the edges of the triangular lattice, and resembles a plurality of hexagons with triangles connecting them. An exemplary Kagome lattice used herein is shown with distinguished sublattices, as shown in FIG. 2.

The Hamiltonian given by:

$$h = \sum_i \mu_i n_i + U_0 \sum_i n_i^2 + U \sum_{(i,j) \in O} n_i n_j + \sum_{(i,j) \in \triangleright \triangleleft \notin O} V_{ij} n_i n_j - \sum_{(i,j)} t_{ij}(c_i^\phi c_j + c_j^\phi c_i) + \text{Ring}. \quad (1)$$

is the occupation number on site i, and $\mu_i$ is the corresponding chemical potential. $U_0$ is the usual onsite Hubbard energy $U_0$ (superfluous for spinless fermions). U is a (positive) Coulomb penalty for having two particles on the same hexagon while $V_{ij}$ represents a penalty for two particles occupying the opposite corners of "bow-ties" (in other words, being next-nearest neighbors on one of the straight lines). Allowing for the possibility of inhomogeneity, not all $V_{ij}$ are assumed equal. Specifically, define $v^c{}_{ab} = V_{ij}$, where a is the color of site (i), b is the color of (j), and c is the color of the site between them. In the lattice of FIG. 2, each of the following is possible distinct, $v^g{}_{bb}$, $v^b{}_{bb}$, $v^g{}_{bg}$, $v^b{}_{rb}$, and $v^b{}_{rg}$, where r∈R, g∈G, and b∈B=K\(R∪G). $t_{ij}$ is the usual nearest-neighbor tunnelling amplitude which is also assumed to depend only on the color of the environment: $t_{ij} \equiv t_{cab}$ where c now refers to the color of the third site in a triangle. "Ring" is a ring exchange term—an additional kinetic energy term which is added to the Hamiltonian on an ad hoc basis to allow correlated multi-particle hops which "shift" particles along some closed paths.

The onsite Hubbard energy $U_0$ is considered to be the biggest energy in the problem, and it is set to infinity, thereby restricting the attention to the low-energy manifold with sites either unoccupied or singly-occupied. The rest of the energies satisfy the following relations: $U \gg t_{ij}, V_{ij}, \mu_i$.

Equations may be derived to the second order in perturbation theory for the ground state manifold of this extended Hubbard model. Such equations are provided below. The solutions describe parameter regimes within the Hubbard model for the existence of the phase called d-isotopy. Technically, the dotted sublattice of the Kagome is desirably altered by a system of defects, or alternatively a "ring exchange term" is desirably introduced to achieve d-isotopy; the bare model yields the ground state manifold "weak d-isotopy", but this distinction is only technical. Both "weak" and "ordinary" behave similarly at the next step.

It is known from the theory of C*-algebras that for "special" $d=2 \cos \pi/(k+2)$, d-isotopy has a unique symmetry which if broken will relieve the extensive degeneracy of the ground state manifold to a mere finite degeneracy (which depends on topology and boundary conditions). It is further known that once this symmetry is broken, the result is the topological phase Vd. Vd functions as a universal quantum computer. In accordance with the present invention, under a large domain of perturbations, this symmetry will be broken. Thus, the Hamiltonians in accordance with the present invention are blueprints for d-isotopy and hence, after perturbation, for a universal quantum computational system. Such a system has a degree of topological protection from decoherence, which is an enemy of quantum computation. The strength of this protection will depend on the size of the spectral gap above Vd—a quantity which is difficult to compute but can be bounded from the energy scales of any given implantation. There is no a priori basis (such as exists in the FQHE) for asserting that this spectral gap will be small.

Although the equations first solve for an occupation model with Kagome geometry, the invention extends to any physical implementation of the quantum doubles of SU(2) Chern-Simons theory (and their Kauffman-Turaev-Viro) variants which proceed by breaking the symmetry inherent in d-isotopy at its "special" values. Such implementations may be based on lattice models with spin or occupation degrees of freedom or based on field theory.

The non-abelian topological phases which arise are related to the doubled SU(2) Chern-Simons theories described in the prior art. These phases are characterized by $(k+1)^2$-fold ground state degeneracy on the torus T2 and should be viewed as a natural family containing the topological (deconfined) phase of $Z_2$ gauge theory as its initial element, k=1. For k≧2, the excitations are non-abelian. For k=3 and k≧5, the excitations are computationally universal.

The conditions that a microscopic model should satisfy in order to be in such a topological phase are described. It is useful to think of such a microscopic model as a lattice regularization of a continuum model whose low energy Hilbert space may be described as a quantum loop gas. More precisely, a state is defined as a collection of non-intersecting loops. A Hamiltonian acting on such state can do the following: (i) the loops can be continuously deformed—this "move" is referred to as an isotopy move; (ii) a small loop can be created or annihilated—the combined effect of this move and the isotopy move is referred to as 'd-isotopy'; and (iii) when exactly k+1 strands come together in some local neighborhood, the Hamiltonian can cut them and reconnect the resulting "loose ends" pairwise so that the newly-formed loops are still non-intersecting.

More specifically, in order for this model to be in a topological phase, the ground state of this Hamiltonian should be a superposition of all such pictures with the additional requirements that (i) if two pictures can be continuously deformed into each other, they enter the ground state superposition with the same weight; (ii) the amplitude of a picture with an additional loop is d times that of a picture without such loop; and (iii) this superposition is annihilated by the application of the Jones-Wenzl (JW) projector that acts locally by reconnecting k+1 strands. It should be noted that, as described herein, the particular form of these projectors is highly constrained and leads to a non-trivial Hilbert space only for special values of $d=\pm 2\cos \pi/(k+2)$. A Hamiltonian is constructed which enforces d-isotopy for its ground state manifold (GSM).

Figure 3:
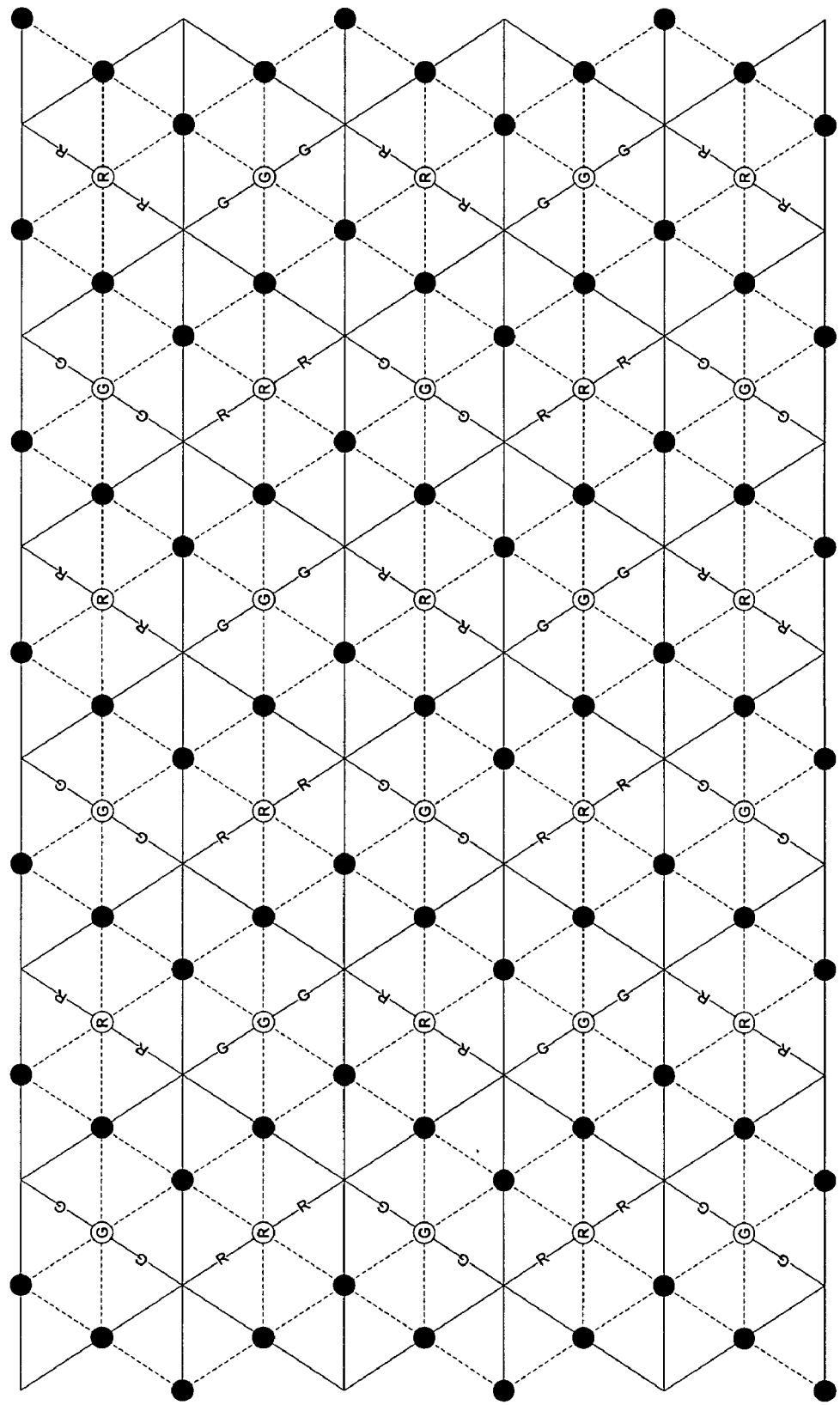
FIG. 3 is a diagram of an exemplary Kagome lattice in accordance with the present invention.

An exemplary model is defined on the Kagome lattice shown in FIG. 3, which is similar to that shown in FIG. 2. The sites of the lattice are not completely equivalent, and two sublattices are shown, as represented by R (red) and G (green). In FIG. 3, solid dots and dashed lines represent sites and bonds of the Kagome lattice K with the special sublattices R and G. Solid lines define the surrounding triangular lattice.

A dimer cover refers to every vertex meeting exactly one (i.e., one and only one) edge. Dimer covers arise physically (naturally) by repulsion. For example, electrons repel each other to form dimer covers.

As shown, green is a perfect match (as defined above), and red is a second perfect match. Two perfect matches result in multiloops that alternate in color (green, red, green, red, etc.).

It is possible that a green dimer and a red dimer cover the same edge. A solution is to consider it a very short loop of length two (a red and green—assume one of the red or green is slightly displaced so it is a "flat" loop). The multiloops will have alternated these dimers.

Encoding is desirable for an exemplary quantum computing model. The loops are encoded in dimers, and the rules are encoded in particle (e.g., electronic) interactions, such as repulsion or tunneling, for example. In certain situations, when electrons get too close, the system passes from the ground state to the excited state and back to the ground state. This is a virtual process seen in second order perturbation theory and is used to build fluctuations; it generates a deformation.

The "undoped" system corresponds to the filling fraction one-sixth (i.e., $Np \equiv \Sigma i\ ni = N/6$, where N is the number of sites in the lattice). The lowest-energy band then consists of configurations in which there is exactly one particle per hexagon, hence all U-terms are set to zero. These states are easier to visualize if a triangular lattice T is considered whose sites coincide with the centers of hexagons of K, where K is a surrounding lattice for T. Then a particle on K is represented by a dimer on T connecting the centers of two adjacent hexagons of K.

Figure 4:
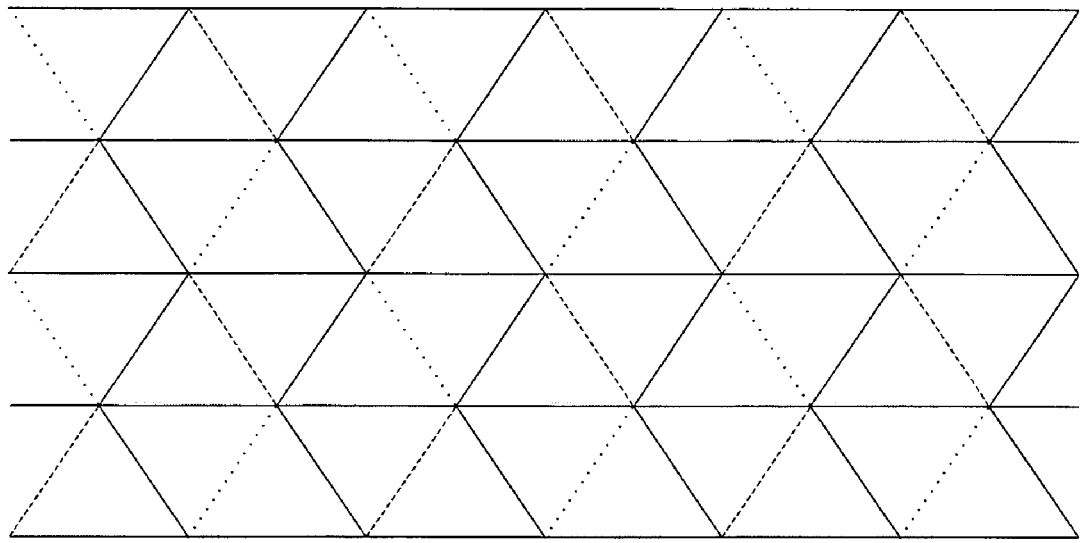
FIG. 4 is a diagram of an exemplary lattice that is useful for describing aspects of the present invention.

The condition of one particle per hexagon translates into the requirement that no dimers share a site. In the ⅙-filled case, this low-energy manifold coincides with the set of all dimer coverings (perfect matchings) of T. The "red" bonds of T (the ones corresponding to the sites of sublattice R) themselves form one such dimer covering, a so-called "staggered configuration". This particular covering is special: it contains no "flippable plaquettes", or rhombi with two opposing sides occupied by dimers. See FIG. 4, which shows a triangular lattice T obtained from K by connecting the centers of adjacent hexagons. The bonds corresponding to the special sublattices R and G are shown in dashed and dotted lines, respectively. Triangles with one red side are shaded.

Therefore, particles live on bonds of the triangular lattice and are represented as dimers. In particular, a particle hop corresponds to a dimer "pivoting" by 60 degrees around one of its endpoints. $V_{ij}=V^c{}_{ab}$ is now a potential energy of two parallel dimers on two opposite sides of a rhombus, with c being the color of its short diagonal.

Desirably, the triangular lattice is not bipartite. On the edges of a bipartite lattice, the models will have an additional, undesired, conserved quantity (integral winding numbers, which are inconsistent with the JW projectors for k>2), so the edge of the triangular lattice gives a simple realization.

Because a single tunneling event in D leads to dimer "collisions" (two dimers sharing an endpoint) with energy penalty U, the lowest order at which the tunneling processes contribute to the effective low-energy Hamiltonian is 2. At this order, the tunneling term leads to two-dimer "plaquette flips" as well as renormalization of bare onsite potentials due to dimers pivoting out of their positions and back.

By fixing R as in FIG. 3, without small rhombi with two opposite sides red, as the preferred background dimerization, the fewest equations are obtained along with ergodicity under a small set of moves. Unlike in the usual case, the background dimerization R is not merely a guide for the eyes, it is physically distinguished: the chemical potentials and tunneling amplitudes are different for bonds of different color.

Figure 5:
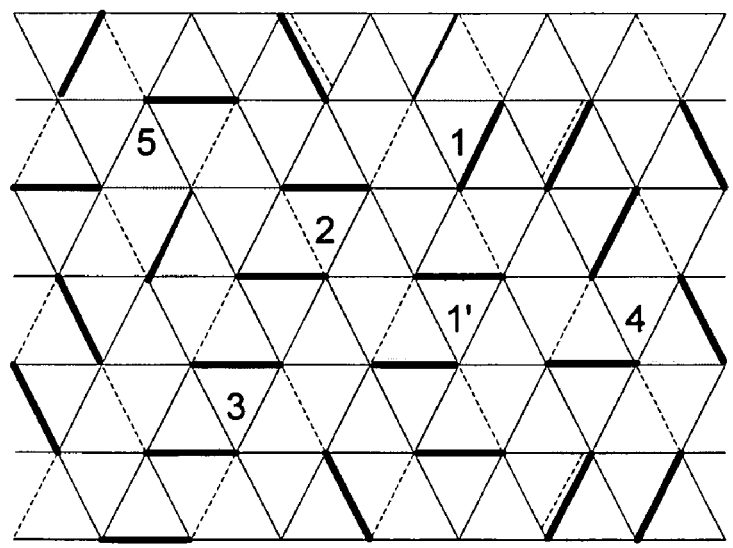
FIG. 5 is a diagram of an exemplary lattice useful for describing dimer moves in accordance with the present invention.

Exemplary elementary dimer moves that preserve the proper dimer covering condition includen plaquette flips, triangle moves, and bow-tie moves. A plaquette (rhombus) flip is a two-dimer move around a rhombus made of two lattice triangles. Depending on whether a "red" bond forms a side of such a rhombus, its diagonal, or is not found there at all, the plaquettes are referred to, respectively, as type 1 (or 1'), 2, or 3 (see the lattice diagram of FIG. 5). FIG. 5 shows an overlap of a dimer covering of T (shown in thick black line) with the red covering shown in dashed line) corresponding to the special sublattice R. Shaded plaquettes correspond to various dimer moves described herein.

The distinction between plaquettes of type 1 and 1' is purely directional: diagonal bonds in plaquettes of type 1 are horizontal, and for type 1' they are not. This distinction is desirable because the Hamiltonian breaks the rotational symmetry of a triangular (or Kagome) lattice. A triangle move is a three-dimer move around a triangle made of four elementary triangles. One such "flippable" triangle is labelled 4 in FIG. 5. A bow-tie move is a four-dimer move around a "bow-tie" made of six elementary triangles. One such "flippable" bow tie is labelled 5 in FIG. 5.

To make each of the above moves possible, the actual dimers and unoccupied bonds desirably alternate around a corresponding shape. For both triangle and bow-tie moves, the cases when the maximal possible number of "red" bonds participate in their making (2 and 4 respectively) are depicted. Note that there are no alternating red/black rings of fewer than 8 lattice bonds (occupied by at most 4 non-colliding dimers). Ring moves only occur when red and black dimers alternate; the triangle labelled 4 in FIG. 5 does not have a ring term associated with it, but the bow-tie labelled 5 does.

The correspondence between the previous smooth discussion and rhombus flips relating dimerizations of J of T is now described. The surface is now a planar domain with, possibly, periodic boundary conditions (e.g., a torus). A collection of loops is generated by R∪J, with the convention that the dimers of R∩J be considered as length 2 loops or bigons). Regarding isotopy, move 2 is an isotopy from R∪J to R∪J' but by itself, it does almost nothing. It is impossible to build up large moves from type 2 alone. So it is a peculiarity of the rhombus flips that there is no good analog of isotopy alone but instead go directly to d-isotopy. The following relations associated with moves of type 5 and 1 (1') are imposed:

$$d^3\Psi(\text{⌧})-\Psi(\text{⌧})=0, \qquad (2a)$$

$$d\Psi(\text{⌧})-\Psi(\text{⌧})=0 \qquad (2b)$$

because from one to four loops in Equation (2a) is passed, and zero to one loop is passed in Equation (2b).

Having stated the goal, the effective Hamiltonian $$\tilde{H}:D\to D$$

is derived on the span of dimerizations. The derivation is perturbative to the second order in $\epsilon$ where $\epsilon = t^r_{bb}/U = t^b_{gb}/U$. Additionally, $t^b_{rb}/U = c_0\epsilon$ where $c_0$ is a positive constant, while $t^g_{bb} = o(\epsilon)$ and can be neglected in the second-order calculations. (In the absence of a magnetic field, all t's can be made real and hence symmetric with respect to their lower indices. Also, U=1 for notational convenience.) Account for all second-order processes, i.e., those processes that take us out of D and then back to D. These amount to off-diagonal (hopping) processes—"plaquette flips" or "rhombus moves"—as well as diagonal ones (potential energy) in which a dimer pivots out and then back into its original position. The latter processes lead to renormalization of the bare onsite potentials $\mu_i$, which are adjusted so that all renormalized potentials are equal up to corrections $0(\epsilon^3)$. The non-constant part of the effective Hamiltonian comes from the former processes and can be written in the form:

$$\tilde{H} = \Sigma_{I,J}(\tilde{H}_{I,J} \dot{x} II) \Delta_{IJ}$$

where $$\tilde{H}_{IJ}$$

is a 2×2 matrix corresponding to a dimer move in the two-dimensional basis of dimer configurations connected by this move. $\Delta_{IJ}=1$ if the dimerizations I, J $\in$ D are connected by an allowed move, and $\Delta_{IJ}=0$ otherwise.

Therefore, it suffices to specify these 2×2 matrices for the off-diagonal processes. For moves of types (1)-(3), they are given below:

$$\tilde{H}^{(1)} = \begin{pmatrix} v^b_{gb} & -2t^b_{rb}t^b_{gb} \\ -2t^b_{rb}t^b_{gb} & v^b_{rb} \end{pmatrix} = \begin{pmatrix} v^b_{gb} & -2c_0\epsilon^2 \\ -2c_0\epsilon^2 & v^b_{rb} \end{pmatrix}, \quad (3a)$$

$$\tilde{H}^{(1')} = \begin{pmatrix} v^b_{bb} & -2t^b_{rb}t^b_{gb} \\ -2t^b_{rb}t^b_{gb} & v^b_{rg} \end{pmatrix} = \begin{pmatrix} v^b_{bb} & -2c_0\epsilon^2 \\ -2c_0\epsilon^2 & v^b_{rb} \end{pmatrix}, \quad (3b)$$

$$\tilde{H}^{(2)} = \begin{pmatrix} v^r_{bb} & -2(t^r_{bb})^2 \\ -2(t^r_{bb})^2 & v^r_{bb} \end{pmatrix} = \begin{pmatrix} v^r_{bb} & -2\epsilon^2 \\ -2\epsilon^2 & v^r_{bb} \end{pmatrix}, \quad (3c)$$

$$\tilde{H}^{(3)} = \begin{pmatrix} v^g_{bb} & -2(t^g_{bb})^2 \\ -2(t^g_{bb})^2 & v^g_{bb} \end{pmatrix} = \begin{pmatrix} v^g_{bb} & 0 \\ 0 & v^g_{bb} \end{pmatrix}. \quad (3d)$$

$\tilde{H}$ can now be tuned to the "small loop" value d.

$$\tilde{H}^{(1)} = \tilde{H}^{(1')} \propto \begin{pmatrix} d & -1 \\ -1 & d^{-1} \end{pmatrix}$$

is required because these moves change the number of small loops by one. Because a move of type 2 is an isotopy move, $$\tilde{H}^{(2)} \propto \begin{pmatrix} 1 & -1 \\ -1 & 1 \end{pmatrix}$$

$\tilde{H}^{(3)} = 0$ provided d>1, because it represents a "surgery" on two strands not allowed for k>1. For k=1, on the other hand, $$\tilde{H}^{(3)} \propto \begin{pmatrix} 1 & -1 \\ -1 & 1 \end{pmatrix}.$$

At level k=1 configurations which differ by such a surgery should have equal coefficients in any ground state vector $\Psi$ while at levels k>1 no such relation should be imposed. Thus, for k>1, the matrix relations (3a-3d) yield equations in the model parameters:

Types (1) & (1'): $v^b_{gb} = v^b_{bb} = 2dc_0\epsilon^2$ (4a)

and $v^b_{rb} = v^b_{rg} = 2d^{-1}c_0\epsilon^2$ (4b)

Types (2) & (3): $v^r_{bb} = 2\epsilon^2$ and $v^g_{bb} = 0$ (4c)

Suppose that the Hamiltonian has a bare ring exchange term, ring in Eq. (1):

$$\tilde{H}^{(Ring)} = \begin{pmatrix} x & -c_3\epsilon^2 \\ -c_3\epsilon^2 & y \end{pmatrix}$$

for some constants c3, x, y>0, and consider the additional equations which come from considering Ring as a fluctuation between one loop of length 8 (type 5 in FIG. 5) and four bigons. It follows from equation (2a) that $$\tilde{H}^{(Ring)} \propto \begin{pmatrix} d^3 & -1 \\ -1 & d^{-3} \end{pmatrix}, \text{ so:}$$

$$x = d^3 c_3 \epsilon^2, \, y = d^{-3} c_3 \epsilon^2. \quad (5)$$

are the additional equations (beyond equations (4)) to place the model at the soluble point characterized by d-isotopy. It is clear from equation (5) that the diagonal entries of $\tilde{H}^{(Ring)} x \neq y$—perhaps not the most natural choice (although these entries may be influenced by the local chemical environment and thus do not need to be equal). Another possibility exploits the ambiguity of whether a bigon should be considered a loop or not—which allows one to choose x=y.

This construction shows how an extended Hubbard model with the additional ring exchange term (or the equivalent quantum dimer model) can be tuned to have a d-isotopy space as its GSM. Further tuning to its special values then allows the JW projectors to reduce this manifold to the correct ground state corresponding to the unique topological phase associated with this value of d. A simple candidate for a universal quantum computer would be tuned to d=(1+sqrt 5)/2.

Although the exemplary embodiments are described with respect to a triangular lattice, it is contemplated that other lattices, such as a square or hexagonal lattice, may be used in accordance with the present invention. Moreover, the use of irregular lattices is contemplated.

Example Quantum Computational Systems

Quantum computational systems according to the invention may include quantum computers, as described above, as well as quantum cryptography systems, quantum information processing systems, quantum storage media, and special purpose quantum simulators, for example.

In a quantum cryptography system according to the invention, respective braids that correspond to the plain text and the encryption key may be defined. The key braid may be applied to the plain-text braid to generate an encrypted-text braid. As quantum key exchange is well known, a quantum cryptography system according to the invention may receive the key from a remote computer, and interpret the received key as a braid. To decrypt the encrypted text, the key braid may be applied to the encrypted text braid to reestablish the plain-text braid. Any symmetric or asymmetric encryption algorithm, such as public-key encryption, for example, may be employed.

A flowchart of an example method for encrypting plain text using quantum computations is provided in FIG. 6A. At step 600, the encryption key is received. The key may be received from a remote computer, via quantum key exchange, for example, or be resident on the local computer. At step 602 the key is interpreted as a quantum braid. At step 604, the plain text may be established as a quantum braid on the lattice by moving the quasi-particles within the lattice as described above. At step 606, the key braid may be applied to the plain-text braid to form an encrypted-text braid on the lattice. That is, after the plain-text braid is established on the lattice, the quasi-particles may be moved within the lattice as prescribed by the key braid. The resulting braid represents the encrypted text. Thus, the key operates on the plain text to generate encrypted text. It should be understood that, as used herein, the terms "plain text" and "encrypted text" refer to any information in clear and encrypted form, respectively.

A flowchart of an example method for decrypting encrypted text using quantum computations is provided in FIG. 6B. At step 610, the encryption key may be received as described above. At step 612, the key is interpreted as a quantum braid. At step 614, the encrypted text may be established as a quantum braid on the lattice by moving the quasi-particles within the lattice as described above. At step 616, the key braid may be applied to the encrypted-text braid to form a plain-text braid on the lattice. That is, after the encrypted-text braid is established on the lattice, the quasi-particles may be moved within the lattice as prescribed by the key braid. The resulting braid represents the plain text. Thus, the key operates on the encrypted text to reestablish the plain text.

A quantum simulator according to the invention may be a quantum computational device that is programmed to produce information about a particular system or a specific application. In that sense, a quantum simulator may be thought of as a special-purpose quantum computer, i.e., a quantum computer that is "hard-coded" to perform a specific function. It should be understood that, consequently, a quantum simulator is expected to be less demanding than a more general quantum computer that may be programmed to perform any number or type of functions.

A quantum storage medium according to the invention may include any platform on which information may be stored in the form of a quantum braid. Such a quantum storage medium may be useful where there is too much information for a conventional storage device to handle. Features of the stored information may then be retrieved from the storage medium later.

It is expected that only some aspects of the stored information may be retrievable from the storage medium. That is, it is expected that, although much larger volumes of data may be stored in a quantum storage medium than on a similarly sized conventional storage medium, some of the stored information may not be retrievable. Accordingly, such quantum storage media may be suitable for applications such as astronomy, for example, where it may be desirable to store large volumes of data, and yet not be necessary to retrieve all aspects of it.

A quantum information processing system according to the invention may include information stored as a braid. A second braid may be applied to the stored braid to alter the stored braid in such a way that subsequent measurements on the storage medium produce a particular aspect/result.

Figure 6C:
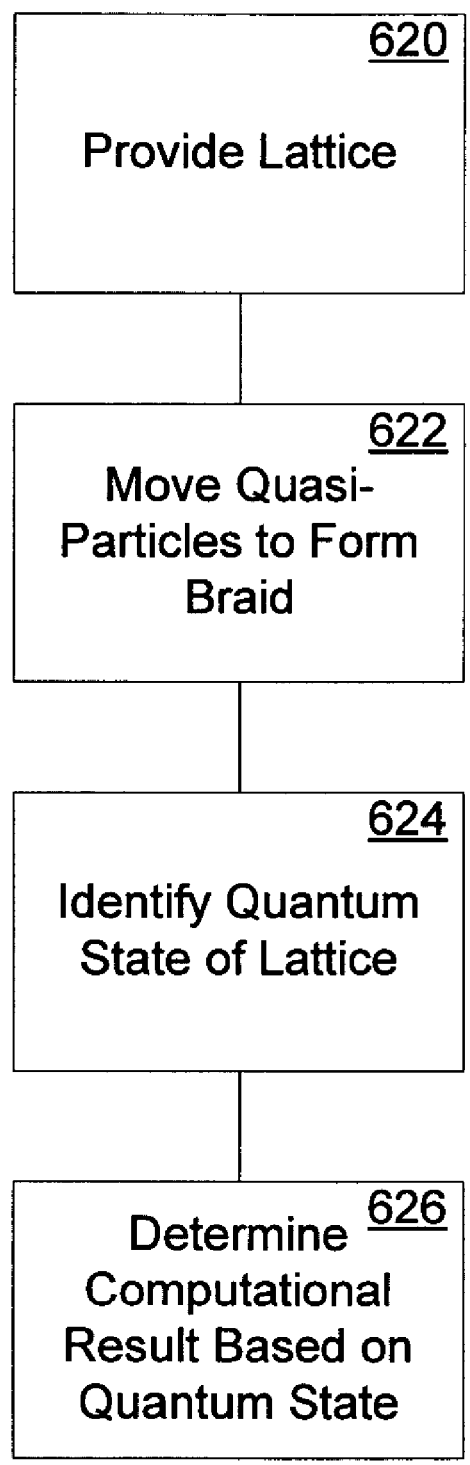

FIG. 6C provides a flowchart of an example embodiment of a quantum computational system according to the invention. Generally, at 620, a lattice having a plurality of quasi-particles disposed thereon is provided. The quasi-particles may be excitations of a system of real particles that form the lattice, such as non-abelian anyons, for example. At 622, the quasi-particles may be moved within the lattice to cause a quantum braid to be formed in the 2D+1-dimensional space-time of the lattice. At 624, a quantum state of the lattice is identified after the quasi-particles have been moved to form the braid. At 626, a computational result may be determined based on the quantum state of the lattice after the braids have been formed. It should be understood that the general technique described in connection with FIG. 6C may be employed to produce quantum cryptography systems, quantum information processing systems, quantum storage media, and special purpose quantum simulators as described above.

Exemplary Computing Environment

Figure 7:
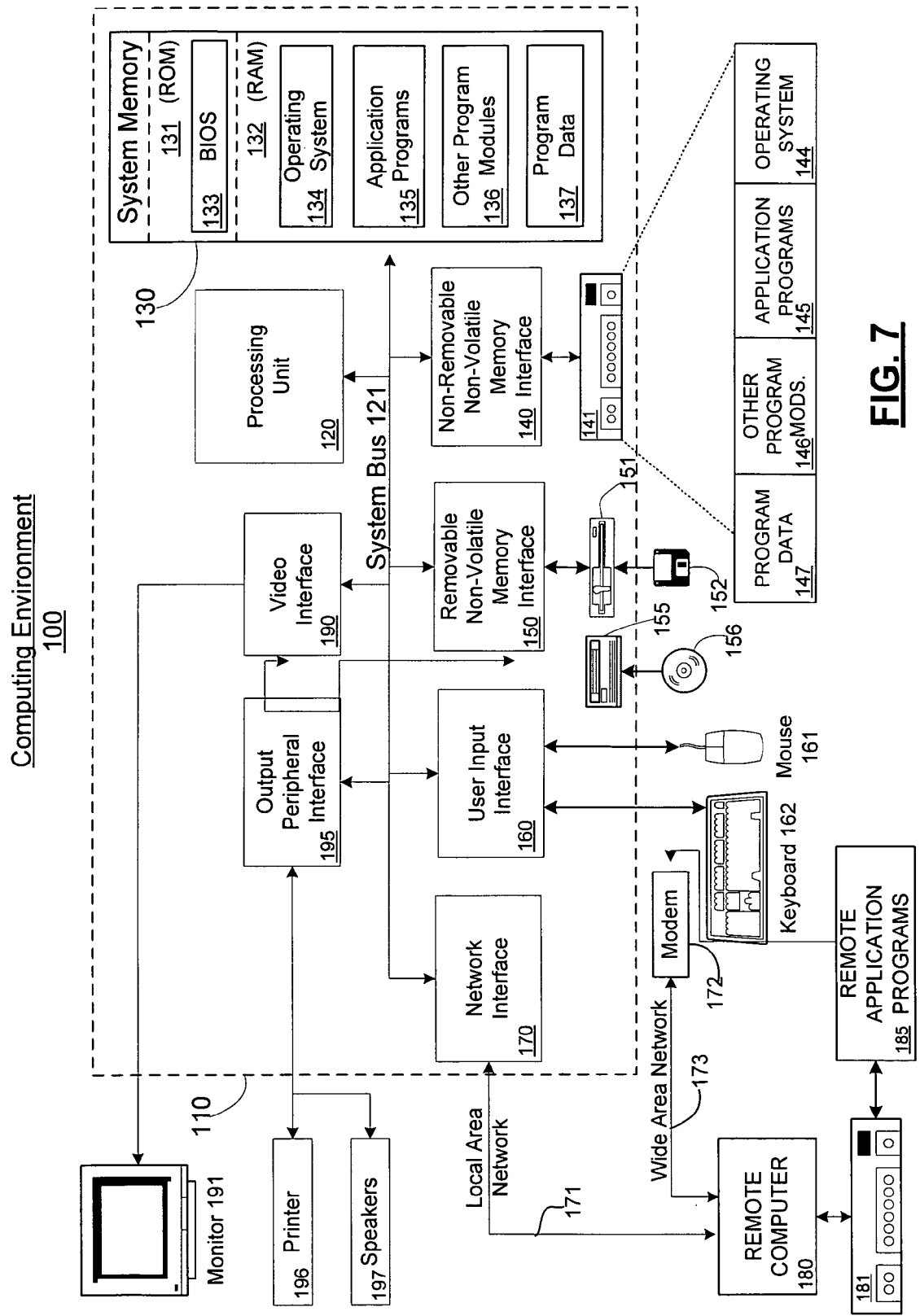
FIG. 7 is a block diagram showing an exemplary computing environment in which aspects of the invention may be implemented.

FIG. 7 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCD) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/non-volatile computer storage media. By way of example only, FIG. 7 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted include a LAN 171 and a WAN 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather should be construed in breadth and scope in accordance with the appended claims.

What is claimed is:

1. A method for encrypting plain text using quantum computations, the method comprising:
    identifying a first quantum state of a lattice having a system of non-abelian anyons disposed thereon, wherein the non-abelian anyons are least-energy excitations of a system of real particles that forms the lattice;
    moving the non-abelian anyons within the lattice to cause a first quantum braid to be formed in the 2D+1-dimensional of the lattice, the first quantum braid corresponding to the plain text;
    moving the non-abelian anyons within the lattice to cause a second quantum braid to be formed in the 2D+1-dimensional space-time of the lattice, the second quantum braid corresponding to an encryption key; and
    determining a second quantum state of the lattice after the first and second quantum braids have been formed, the second quantum state of the lattice corresponding to encrypted text associated with the plain text.

2. The method of claim 1, farther comprising:
    receiving the encryption key from a remote computer; and
    interpreting the received key as the second braid.

3. The method of claim 2, further comprising:
    receiving the encryption key via a quantum key exchange.

4. The method of claim 1, wherein the least-energy excitations are determined by a Hamiltonian operator that is defined from interactions of the system of real particles.

5. The method of claim 4, wherein the real particles define a first dimer covering of the lattice.

6. The method of claim 5, wherein the first dimer covering in combination with a second, fixed, background dimer covering define one or more multi-loops.

7. The method of claim 6, wherein at least one of the least-energy excitations is a superposition of the multi-loops.

8. The method of claim 7, wherein the non-abelian anyons correspond to canonical excitations of the superposition.

9. The method of claim 1, wherein the lattice is a Kagome lattice.

10. The method of claim 9, wherein the Kagome lattice comprises a plurality of hexagons, and wherein each hexagon contains exactly one real particle.

11. The method of claim 9, wherein the Kagome lattice arises as the edge centers of a triangular lattice.

12. The method of claim 1, wherein the lattice has a plurality of lattice sites and, in a ground state, none of said lattice sites hosts more than one dimer and each said site is covered by one dimer.

13. A method for decrypting encrypted text using quantum computations, the method comprising:
    identifying a first quantum state of a lattice having a system of non-abelian anyons disposed thereon, wherein the non-abelian anyons are least-energy excitations of a system of real particles that forms the lattice;
    moving the non-abelian anyons within the lattice to cause a first quantum braid to be formed in the 2D+1-dimensional space-time of the lattice, the first quantum braid corresponding to an encryption key;
    moving the non-abelian anyons within the lattice to cause a second quantum braid to be formed in the 2D+1-dimensional space-time of the lattice, the second quantum braid corresponding to the encrypted text; and
    determining a second quantum state of the lattice after the first and second quantum braids have been formed, the second quantum state of the lattice corresponding to plain text associated with the encrypted text.

14. The method of claim 13, farther comprising:
    receiving the encryption key from a remote computer; and
    interpreting the received key as the first braid.

15. The method of claim 14, farther comprising:
    receiving the encryption key via a quantum key exchange.

16. The method of claim 13, wherein the least-energy excitations are determined by a Hamiltonian operator that is defined from interactions of the system of real particles.

17. The method of claim 16, wherein the real particles define a first dimer covering of the lattice.

18. The method of claim 17, wherein the first dimer covering in combination with a second, fixed, background dimer covering define one or more multi-loops.

19. The method of claim 18, wherein at least one of the least-energy excitations is a superposition of the multi-loops.

20. The method of claim 19, wherein the non-abelian anyons correspond to canonical excitations of the superposition.

21. The method of claim 13, wherein the lattice is a Kagome lattice.

22. The method of claim 21, wherein the Kagome lattice comprises a plurality of hexagons, and wherein each hexagon contains exactly one real particle.

23. The method of claim 21, wherein the Kagome lattice arises as the edge centers of a triangular lattice.

24. The method of claim 13, wherein the lattice has a plurality of lattice sites and, in a ground state, none of said lattice sites hosts more than one dimer and each said site is covered by one dimer.

* * * * *

UNITED STATES PATENT AND TRADEMARK OFFICE
CERTIFICATE OF CORRECTION

PATENT NO. : 7,525,202 B2
APPLICATION NO. : 10/931083
DATED : April 28, 2009
INVENTOR(S) : Michael Freedman et al.

Page 1 of 1

It is certified that error appears in the above-identified patent and that said Letters Patent is hereby corrected as shown below:

In column 15, line 58, in Claim 2, delete "farther" and insert -- further --, therefor.

In column 16, line 37, in Claim 14, delete "farther" and insert -- further --, therefor.

In column 16, line 40, in Claim 15, delete "farther" and insert -- further --, therefor.

Signed and Sealed this
Third Day of May, 2011

David J. Kappos
*Director of the United States Patent and Trademark Office*